(12) United States Patent
McNulty et al.

(10) Patent No.: US 11,103,780 B2
(45) Date of Patent: Aug. 31, 2021

(54) SAVING AND RESTORING VIRTUAL MACHINE STATES AND HARDWARE STATES FOR APPLICATION CONTENT

(71) Applicant: Microsoft Technology Licensing, LLC, Redmond, WA (US)

(72) Inventors: Mark James McNulty, Renton, WA (US); Blaine Craig Hauglie, Snohomish, WA (US); Paul Joseph Wolfteich, Seattle, WA (US); Thomas Fahrig, Redmond, WA (US); David Neil Cutler, Medina, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 10 days.

(21) Appl. No.: 16/774,610

(22) Filed: Jan. 28, 2020

(65) Prior Publication Data

US 2021/0129024 A1 May 6, 2021

Related U.S. Application Data

(60) Provisional application No. 62/931,624, filed on Nov. 6, 2019.

(51) Int. Cl.
*A63F 13/49* (2014.01)
*A63F 13/70* (2014.01)

(52) U.S. Cl.
CPC .............. *A63F 13/49* (2014.09); *A63F 13/70* (2014.09); *A63F 2300/532* (2013.01); *A63F 2300/554* (2013.01)

(58) Field of Classification Search
CPC .... A63F 13/49; A63F 13/70; A63F 2300/532; A63F 2300/554
See application file for complete search history.

(56) References Cited

U.S. PATENT DOCUMENTS

| | | | |
|---|---|---|---|
| 8,979,655 B2 | 3/2015 | Mamtani et al. | |
| 9,248,374 B2 | 2/2016 | Watson et al. | |
| 9,606,782 B2* | 3/2017 | Chan | ................... H04L 63/0853 |
| 9,606,822 B2* | 3/2017 | Hunt | ................... G06F 9/45558 |
| 9,645,839 B2 | 5/2017 | Jacobson et al. | |
| 9,795,879 B2 | 10/2017 | Colenbrander | |

(Continued)

OTHER PUBLICATIONS

"Overview of Cloud Game Infrastructure", Retrieved From: https://web.archive.org/web/20190703190358/https:/cloud.google.com/solutions/gaming/cloud-game-infrastructure, Jul. 3, 2019, 13 Pages.

(Continued)

*Primary Examiner* — Reginald A Renwick
(74) *Attorney, Agent, or Firm* — Ray Quinney & Nebeker; Tiffany Healy

(57) ABSTRACT

The present disclosure relates to devices, methods, and computer-readable medium for saving and restoring physical hardware states and virtual machine (VM) states for an application actively being executed on a virtual machine by a user on a computer device. The devices, methods, and computer-readable medium may allow a user to suspend a current state of an application session and save the VM and memory state to persistent storage, and later resume the execution of the saved application session by reading the state back into memory and restoring the VM state.

20 Claims, 6 Drawing Sheets

(56) References Cited

U.S. PATENT DOCUMENTS

2013/0268931 A1   10/2013  Ohare et al.
2013/0273999 A1   10/2013  Seheux et al.
2014/0113705 A1    4/2014  Fear
2015/0120674 A1    4/2015  Lavoie et al.
2015/0367238 A1   12/2015  Perrin et al.

OTHER PUBLICATIONS

Kamarainen, et al., "Virtual Machines vs. Containers in Cloud Gaming Systems", In International Workshop on Network and Systems Support for Games, Dec. 3, 2015, 6 Pages.

"International Search Report & Written Opinion issued in PCT Application No. PCT/US20/057262", dated Feb. 9, 2021, 11 Pages.

\* cited by examiner

SAVING AND RESTORING VIRTUAL MACHINE STATES AND HARDWARE STATES FOR APPLICATION CONTENT

CROSS-REFERENCE TO RELATED APPLICATIONS

This application claims the benefit of U.S. Provisional Patent Application Ser. No. 62/931,624, filed Nov. 6, 2019, which is hereby incorporated by reference in its entirety.

BACKGROUND

Today digital games may include a large amount of data so that a significant amount of content may be loaded for the game when a user launches a game to play. Thus, from launching the game to getting ready to play may take several minutes. The delay in loading games may either deter users from playing the game or users may choose to partake in a secondary activity while the game boots up.

In addition, users have limited options for pausing and/or saving game play. Gaming consoles today can hibernate or suspend a game in active play. However, the gaming consoles must maintain power during the hibernated state so that the game can be persistently stored in memory and rehydrate itself allowing a user to continue to play the same game. Thus, if the console loses power and/or another user played the game or a different game in the interim, the suspended game may not restart.

These and other problems exist in providing gaming content to end users.

BRIEF SUMMARY

One example implementation relates to a method. The method may include sending a message to an application executing on an application virtual machine to prepare for a save operation. The method may include processing an internal state of an application memory to determine at least one or more of data pages or graphics pages in use for the application. The method may include instructing the processing of the application memory to determine at least one or more of code pages or signature pages in use for the application and converting the at least one or more of the code pages or the signature pages into a known memory alias. The method may include saving an application memory state for the application, wherein the application memory state includes the at least one or more of the data pages or the graphics pages and the known memory alias with the at least one or more of the code pages or the signature pages.

Another example implementation relates to a computer device. The computer device may include at least one memory to store data and instructions, at least one processor in communication with the at least one memory, and an application virtual machine with an application in communication with the computer device, wherein the at least one processor is operable to: send a message to an application executing on the application virtual machine to prepare for a save operation; process an internal state of an application memory to determine at least one or more of data pages or graphics pages in use for the application; instruct the processing of the application memory to determine at least one or more of code pages or signature pages in use for the application and converting the at least one or more of the code pages or the signature pages into a known memory alias; and save an application memory state for the application, wherein the application memory state includes the at least one or more of the data pages or the graphics pages and the known memory alias with the at least one or more of the code pages or the signature pages.

Another example implementation relates to a computer-readable medium storing instructions executable by a computer device. The computer-readable medium may include at least one instruction for causing the computer device to send a message to an application executing on an application virtual machine to prepare for a save operation. The computer-readable medium may include at least one instruction for causing the computer device to process an internal state of an application memory to determine at least one or more of data pages or graphics pages in use for the application. The computer-readable medium may include at least one instruction for causing the computer device to instruct the processing of the application memory to determine at least one or more of code pages or signature pages in use for the application and converting the at least one or more of the code pages or the signature pages into a known memory alias. The computer-readable medium may include at least one instruction for causing the computer device to save an application memory state for the application, wherein the application memory state includes the at least one or more of the data pages or the graphics pages and the known memory alias with the at least one or more of the code pages or the signature pages.

Another example implementation relates to a method. The method may include initiating an application virtual machine restore operation by reading previously stored application memory content for an application. The method may include restoring a hypervisor state by instructing recreation of sensitive application content. The method may include restoring a host state of each input device or output device from a plurality of virtual machines associated with the application. The method may include restoring a system state of each of the input devices or output devices from the plurality of virtual machines associated with the application. The method may include resuming the application virtual machine. The method may include sending a message to the application to resume.

Another example implementation relates to a computer device. The computer device may include at least one memory to store data and instructions, at least one processor in communication with the at least one memory, and an application virtual machine with an application in communication with the computer device, wherein the at least one processor is operable to: initiate an application virtual machine restore operation by reading previously stored application memory content for an application; restore a hypervisor state by instructing recreation of sensitive application content; restore a host state of each input device or output device from a plurality of virtual machines associated with the application; restore a system state of each of the input devices or output devices from the plurality of virtual machines associated with the application; resume the application virtual machine; and send a message to the application to resume.

Another example implementation relates to a computer-readable medium storing instructions executable by a computer device. The computer-readable medium may include at least one instruction for causing the computer device to initiate an application virtual machine restore operation by reading previously stored application memory content for an application. The computer-readable medium may include at least one instruction for causing the computer device to restore a hypervisor state by instructing recreation of sensitive application content. The computer-readable medium may include at least one instruction for causing the computer device to restore a host state of each input device or output device from a plurality of virtual machines associated with the application. The computer-readable medium may include at least one instruction for causing the computer device to restore a system state of each of the input devices or output devices from the plurality of virtual machines associated with the application. The computer-readable medium may include at least one instruction for causing the computer device to resume the application virtual machine. The computer-readable medium may include at least one instruction for causing the computer device to send a message to the application to resume.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

DETAILED DESCRIPTION

Figure 1:
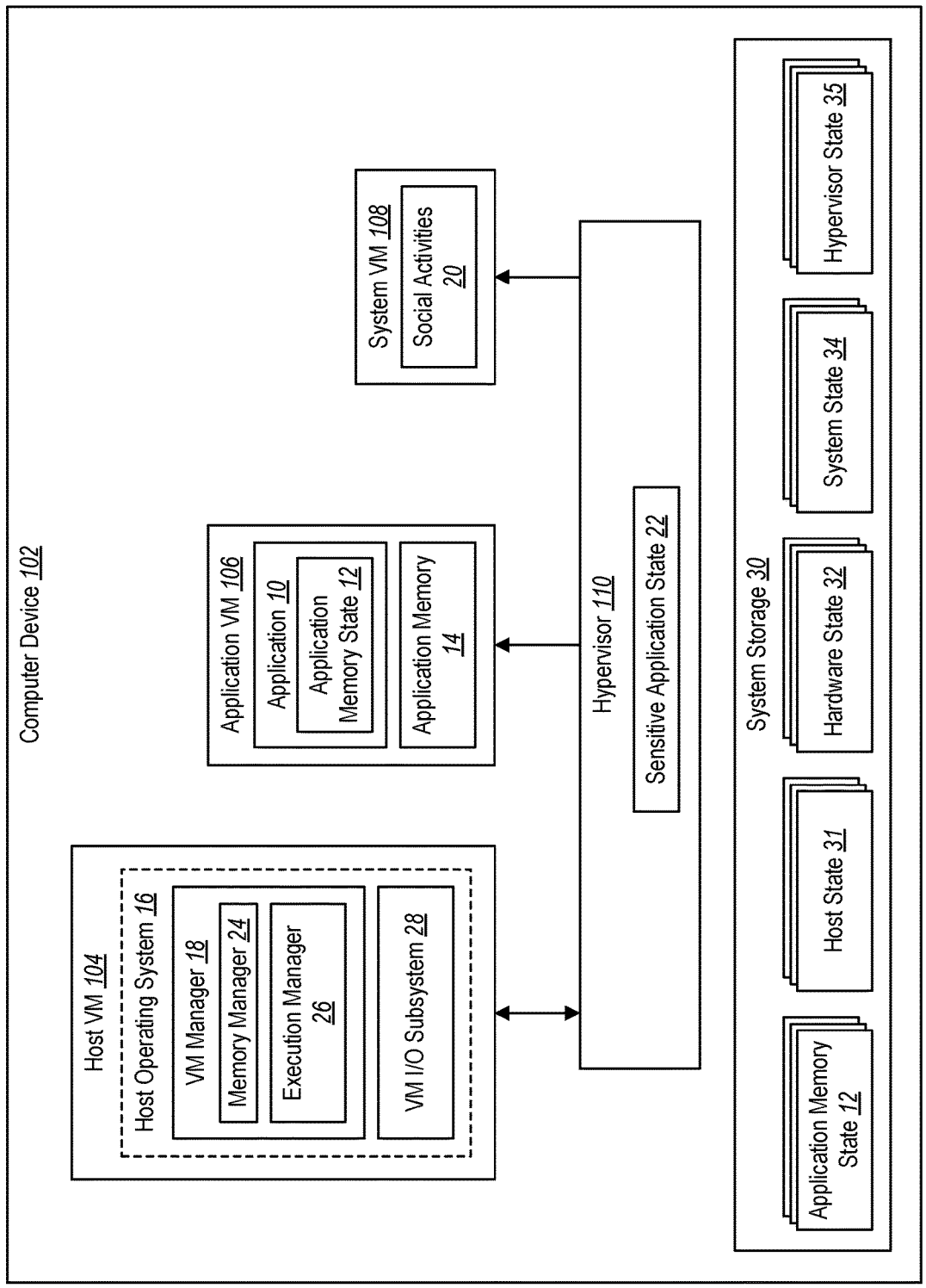
FIG. 1 is a schematic block diagram of an example computer device in accordance with an implementation of the present disclosure.

The present disclosure relates to devices and methods for saving and restoring physical hardware states and virtual machine (VM) states for an application being used. One example application may include a digital game actively being played by a user on a computer device, such as a game console. The present disclosure may save the state of any number of applications (up to n applications, where n is an integer) being used on the computer device. The saved application state may be associated with a user so that a user may not launch a saved state for another user. The present disclosure may allow an application to resume regardless of the number of other applications used in the interim. One example use case may include several games being played in the interim before returning to a saved game.

In addition, to saving the state of the applications, the present disclosure may save a whole virtual machine state for an application being used. In an implementation, a plurality of virtual machines may be used for the application. For example, a host virtual machine, application virtual machine, and a system virtual machine may be used for the application. By using a plurality of virtual machines for the application, additional security and functionality may be provided for the application content. The present disclosure may save a host state, a hardware state, and/or a system state for each of the virtual machines in use for the application. In addition, the present disclosure may save a hypervisor state for the virtual machines being used for the application. By saving the whole virtual machine state, the present disclosure may be able to reconstruct and/or reestablish the state of the hypervisor state, host services, hardware state, and/or system services for each of the virtual machines in use for the application when resuming an application.

The present disclosure may save and restore the physical hardware states and VM states regardless of a power state of the computer device. As such, saving and restoring the physical hardware states and VM states may be non-volatile and may survive system updates and/or console reboots.

The present disclosure may also reduce the load times of applications allowing for quick returns to an application while maintaining the overall current state for the application. For example, when the application is a game, users may quickly launch and resume playing a game when the user returns to the game at a later time, date, or gaming session. Users may also be able to return to the exact in game state from when they left the game session. As such, users may either return directly to the point they left when they saved or exited the game or start from a menu or submenu system of the game eliminating a cold start load process for the game (e.g., logo parade, opening un-skippable movies, initial loads, etc.). In addition, the present disclosure may allow users to quickly switch between games on the computer device by saving the current game and launching or restoring the next game.

In an implementation, the computer device may include a secure virtual machine with a memory region that uses a special encryption key for different memory regions, namely memory aliases. Different application content may be saved in different memory aliases. Application content, such as, but not limited to, game data pages, executable code pages, graphics pages, and/or signature pages may be stored in different memory aliases on an application virtual machine. By encrypting different application content using different memory aliases, the application content may be isolated providing additional security for the application content. Moreover, by using multiple virtual machines, additional security and functionality may be provided for the application content.

The present disclosure may keep track of every memory page and may determine the proper encryption keys for every memory page used by the application so that the memory pages may be read properly by a host operating system on the host virtual machine and saved to a persistent state file on the computer device. Typical save and restore methods for virtual machines may not be used with the present disclosure because of the secure memory aliasing used in the virtual machines.

The present disclosure may allow users to control whether an application resumes using a previously saved state. For example, when the application is a game, a user may want to replay a game level or start a game over. As such, the user may want to force the game to fresh launch even if the game has a previously saved state option. In addition, a user may want to quit a game without saving the current state of the game.

The present disclosure may be used by application developers to aid in identifying and reproducing behaviors within an application. For example, when a developer is reproducing a bug, the developer may want to save the state of the application prior to when the bug is observed. In addition, a developer may want to use a copy of the saved application state to share a representation of the bug with another developer.

In an implementation, a user may designate applications with a priority level. For example, a user may identify one or more applications as a high priority relative to a priority value of other applications. When a user designates an application as a high priority, the present disclosure may preserve the save states for the high priority applications and may not allow the saved states to be overwritten when saving other applications on the computer device. If the system storage on computer device is full or may be running low on space, lower priority applications may not be saved in order to ensure that the higher priority applications are saved.

As such, the present disclosure includes a number of practical applications that provide benefits and/or solve problems associated with providing gaming content to users by allowing a user to suspend a current state of an application session and save the VM and memory state to persistent storage, and later resume the execution of the saved application session by reading the state back into memory and restoring the VM state.

Referring now to FIG. 1, illustrated is an example computer device 102 for use with saving and restoring applications 10 executing on an application virtual machine 106 operating on computer device 102 and/or in communication with computer device 102.

Computer device 102 may include a plurality of virtual machines, such as, but not limited to, a host virtual machine 104, the application virtual machine 106, and a system virtual machine 108. The application virtual machine 106 may have one or more applications 10 that a user may use. One example application 10 may include a digital game actively being played by a user on computer device 102 or streamed to computer device 102 from a remote computer or server. The application virtual machine 106 may access applications 10 from computer device 102. For example, applications may be stored on computer device 102. In addition, the application virtual machine 106 may access applications 10 from remote servers or computing devices in communication with computer device 102. For example, the application virtual machine 106 may stream applications 10 from a remote server or computing device to computer device 102. A user may want to stop, or otherwise pause, application 10 and later resume using application 10. The host virtual machine 104 may include a host operating system 16 and a VM manager 18 that manages the memory of the virtual machines (e.g., host virtual machine 104, application virtual machine 106, and system virtual machine 108). The system virtual machine 108 may include any social activities 20 associated with application 10 and/or other functionality not provided by the host system due to security layering.

Computer device 102 may be a video game console in communication with a display device. The computer device 102 may also refer to various types of computing devices. For example, the computer device 102 may include a mobile device such as a mobile telephone, a smart phone, a personal digital assistant (PDA), a tablet, or a laptop. Additionally, or alternatively, the computer device 102 may include one or more non-mobile devices such as a desktop computer, server device, or other non-portable device. In one or more implementations, the computer device 102 refers to dedicated gaming devices (e.g., handheld gaming devices) in communication with a display device. In one or more implementations, the computer device 102 refers to a game console in communication with remote servers or computing devices. In one or more implementations, the computer device 102 includes graphical user interfaces thereon (e.g., a screen of a mobile device). In addition, or as an alternative, computer device 102 may be communicatively coupled (e.g., wired or wirelessly) to a display device having a graphical user interface thereon for providing a display of gaming content. Computer device 102 may include features and functionality described below in connection with FIG. 7.

The plurality of virtual machines 104, 106, 108 may communicate with a hypervisor 110 component operating on computer device 102. VM manager 18 may instruct or otherwise communicate with hypervisor 110 to send a message to application virtual machine 106 instructing application virtual machine 106 to create an application memory state 12 in a consistent manner and send the application memory state 12 back to host virtual machine 104. VM manager 18 may also send a message to application virtual machine 106 to pause, or otherwise stop, the execution of application 10 (FIG. 1). Suspending the application virtual machine 106 may place the virtual machine 106 in a safe state where the processing of the application virtual machine 106 has paused or stopped. For example, VM manager 18 may suspend the application virtual machine 106 in response to receiving a request to save application 10, pause application 10, or exit application 10.

VM manager 18 may traverse a memory tracking table or database for the application virtual machine 106 that includes a hierarchy of application content. The memory tracking table may include the memory host virtual machine 104 controls for application virtual machine 106. For example, host virtual machine 104 may control a subset of application content. The subset of application content controlled by the host virtual machine 104 may include, for example, the data pages and/or the graphic pages for application 10. For example, a host virtual machine 104 in communication with the application virtual machine 106 may include a VM manager 18 with the memory tracking table for the application virtual machine 106. The memory tracking table may also identify which application content is currently being used by application 10.

Hypervisor 110 may also traverse a memory tracking table for the application virtual machine 106 that includes a hierarchy of application content for the application content controlled by hypervisor 110. Hypervisor 110 may control a subset of the application content. For example, hypervisor 110 may control the code pages and/or the signature pages for application 10. Code pages may include pages that contain executable instructions for application virtual machine 106, which will be executed on the processor. In addition, signature pages may be used to verify the validity of the code pages. Hypervisor 110 may extract the information from the application memory 14 to properly transform the encrypted application content from the subset of the memory aliases associated with the code pages and/or signature pages in use for application 10 into sensitive application state 22 that may be read by the host operating system 16. For example, the subset of memory aliases may include memory aliases storing code pages and/or signature pages.

Hypervisor 110 may convert the identified memory aliases (e.g., the subset of memory aliases for the code pages and signature pates) into sensitive application state 22 so that the host operating system 16 on may read the application content and/or the application memory state 12 in the original form. The transformation process may include decrypting the application content using the proper encryption keys for each of the identified memory aliases. Hypervisor 110 may also generate a hash over the entire hypervisor state 35 and/or possible intermediate stages so that hypervisor 110 may verify the integrity of the restored virtual machine and/or the hypervisor state 35 of the restored virtual machine.

VM manager 18 may save the application memory state 12 in system storage 30 on computer device 102. An encryption process may occur prior to storing the application memory state 12. For example, VM manager 18 and/or hypervisor 110 may encrypt the application memory state 12 prior to storing the application memory 12 in system storage 30. In addition, VM manager 18 may save the application memory state 12, one or more host states 31, one or more system states 34 in use by application 10, one or more hardware states 32 in use by application 10 in system storage 30, and/or a hypervisor state 35 in system storage 30.

Host virtual machine 104 may also include a host operating system 16 that may be used to manage the physical hardware states and VM states for computer device 102. For example, host operating system 16 may include a VM manager 18 and/or a VM input/output (I/O) subsystem 28. The VM manager 18 may include, for example, a memory manager 24 and/or an execution manager 26. The VM manager 18 and/or the VM I/O subsystems 28 may communicate with hypervisor 110 to save and/or restore the physical hardware states and/or VM states for computer device 102.

As such, VM manager 18 may save a whole virtual machine state for the plurality of virtual machines (e.g., host virtual machine 104, application virtual machine 106, and/or system virtual machine 108) being used in connection with application 10. By saving the whole virtual machine state, the state of the hypervisor state, host services, hardware state, and/or system services for each of the plurality of virtual machines may be reestablished when resuming application 10.

As such, computer device 102 may be used to suspend a current state of an application session and save the VM and memory state to persistent storage, and later resume the execution of the saved application session by reading the state back into memory and restoring the VM state.

Figure 2:
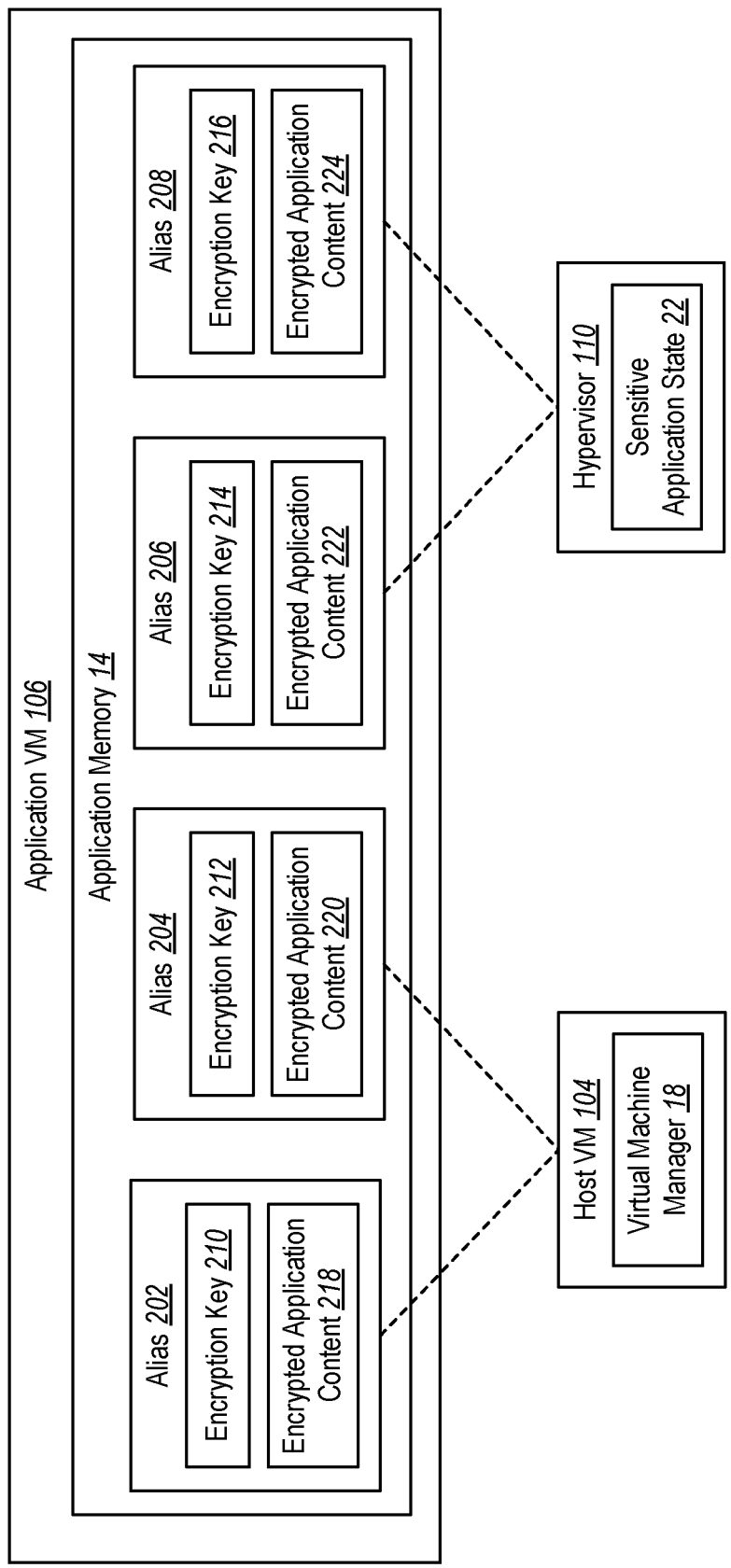
FIG. 2 is schematic diagram of an example of application memory for use with a computer device in accordance with an implementation of the present disclosure.

Referring now to FIG. 2, illustrated is an example application memory 14 for use by the host virtual machine 104 and hypervisor 110. Application memory 14 may consist of various types of content, where each type of content may potentially use a separate memory alias, and therefore, may use a separate encryption. For example, application memory 14 may be a secure memory region that uses a special encryption key 210, 212, 214, 216 for different memory aliases 202, 204, 206, 208. Application memory may include a plurality of memory aliases 202, 204, 206, 208 (up to n memory aliases, where n is an integer). Different encrypted application content 218, 220, 222, 224 may be saved in different memory aliases 202, 204, 206, 208. For example, game data pages may be saved in alias 202, graphics pages may be saved in alias 204, executable code pages may be saved in alias 206, and signature pages may be stored in memory alias 208. By encrypting different application content 218, 220, 222, 224 using different memory aliases 202, 204, 206, 208, the application content may be isolated providing additional security for the application content and/or additional security enforcement against hardware attacks from outside the processor.

Host virtual machine 104 may control a subset of the memory aliases 202, 204, 206, 208. For example, host virtual machine 104 may control memory aliases 202, 204 (the memory aliases associated with the game data pages and the graphics pages). Hypervisor 110 may control a different subset of the memory aliases 202, 204, 206, 208. For example, hypervisor 110 may control memory aliases 206, 208 (the memory aliases associated with the code pages and the signature pages). As such, hypervisor 110 may control memory aliases with sensitive data, such as, code or signature pages, while the host virtual machine 104 may control other memory aliases used for raw data or graphics content.

Hypervisor 110 may decrypt the encrypted application content 222, 224 from the subset of the memory aliases 206, 208 that hypervisor 110 controls. For example, the subset of memory aliases may include memory aliases 206, 208. Using the proper encryption keys 214, 216 for each of the subset of memory aliases 206, 208, hypervisor 110 may convert the encrypted application content 222, 224 from the subset of memory aliases 206, 208 into sensitive application state 22 information in a form that the host operating system 16 (FIG. 1) may understand.

Figure 3:
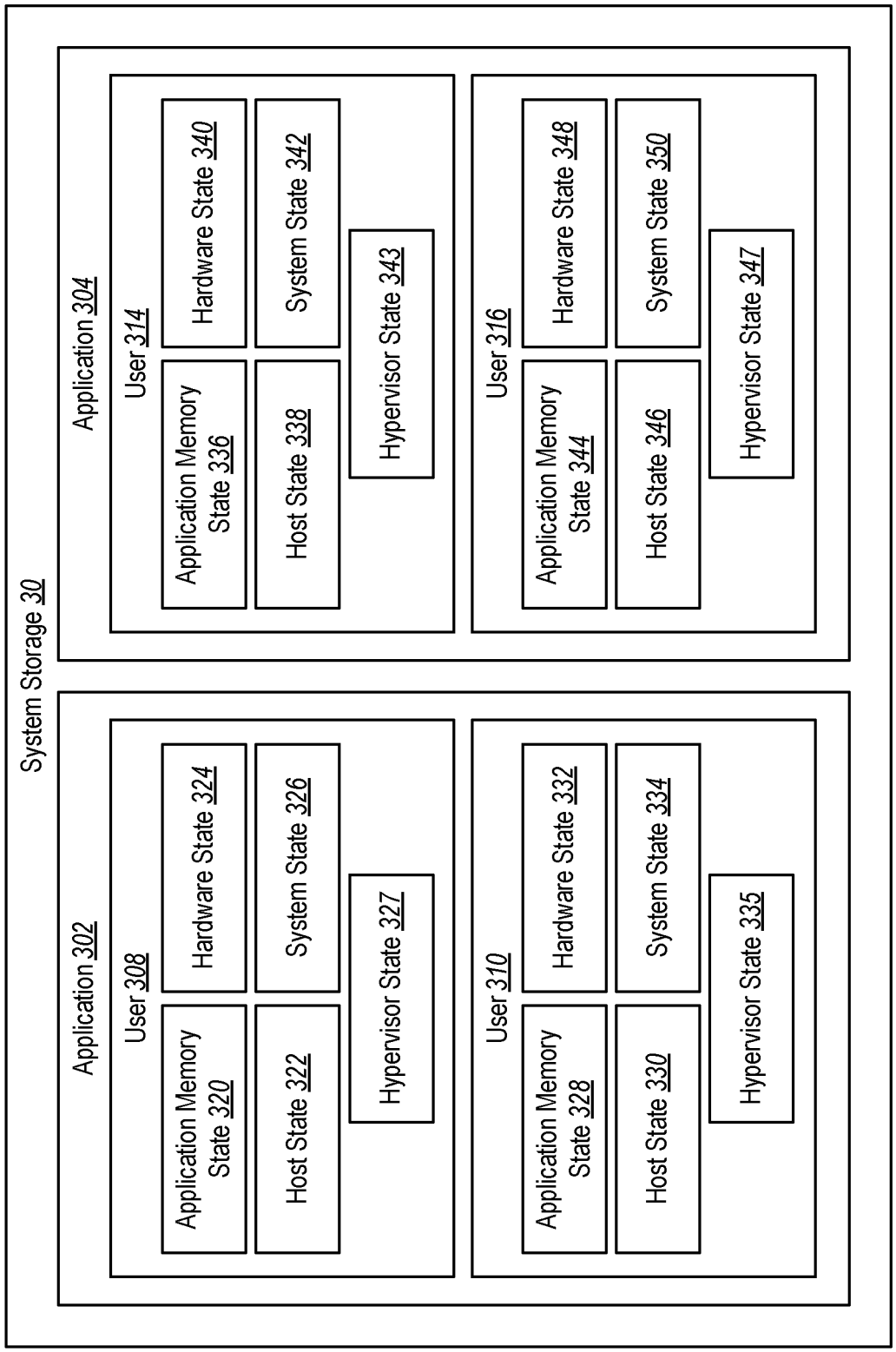
FIG. 3 is schematic diagram of an example of system storage for use with a computer device in accordance with an implementation of the present disclosure.

Referring now to FIG. 3, illustrated is an example system storage 30 for use with computer device 102 (FIG. 1) for saving and restoring physical hardware states and VM states for a digital application 10 actively being used by a user on computer device 102.

System storage 30 may include saved physical hardware states and VM states for a plurality of applications 302, 304 (up to x applications, where x is an integer). In addition, for each application 302, 304, a plurality of users (up to y users, where y is an integer) may use the applications 302, 304. As such, system storage 30 may save physical hardware states and VM states for each user 308, 310, 314, 316 using applications 302, 304.

For example, a first application 302 may have two users 308, 310 that are using application 302 on computer device 102. The user may access application 302 at different times. User 308 may have an application memory state 320, host state 322, hardware state(s) 324, system state(s) 326, and a hypervisor state 327 stored in system storage 30 for application 302. While user 310 may have a different application memory state 328, application host state 330, hardware state(s) 332, system state(s) 334, and hypervisor state 335 stored for application 302.

In addition, a second application 304 may also be used on computer device 102 by two different users 314, 316. Users 314, 316 may use application 304 at different times. In addition, the users may be the same users using application 302 or may be different users. User 314 may have an application memory state 336, host state 338, hardware state(s) 340, system state(s) 342, and a hypervisor state 343 stored in system storage 30 for application 304. While user 316 may have a different application memory state 344, host state 346, hardware state(s) 348, system state(s) 350, and a hypervisor state 347 stored for application 304.

As such, system storage 30 may associated the physical hardware states and VM states for a digital application with an individual user. Thus, preventing users from accessing other users saved states for applications.

Figure 4:
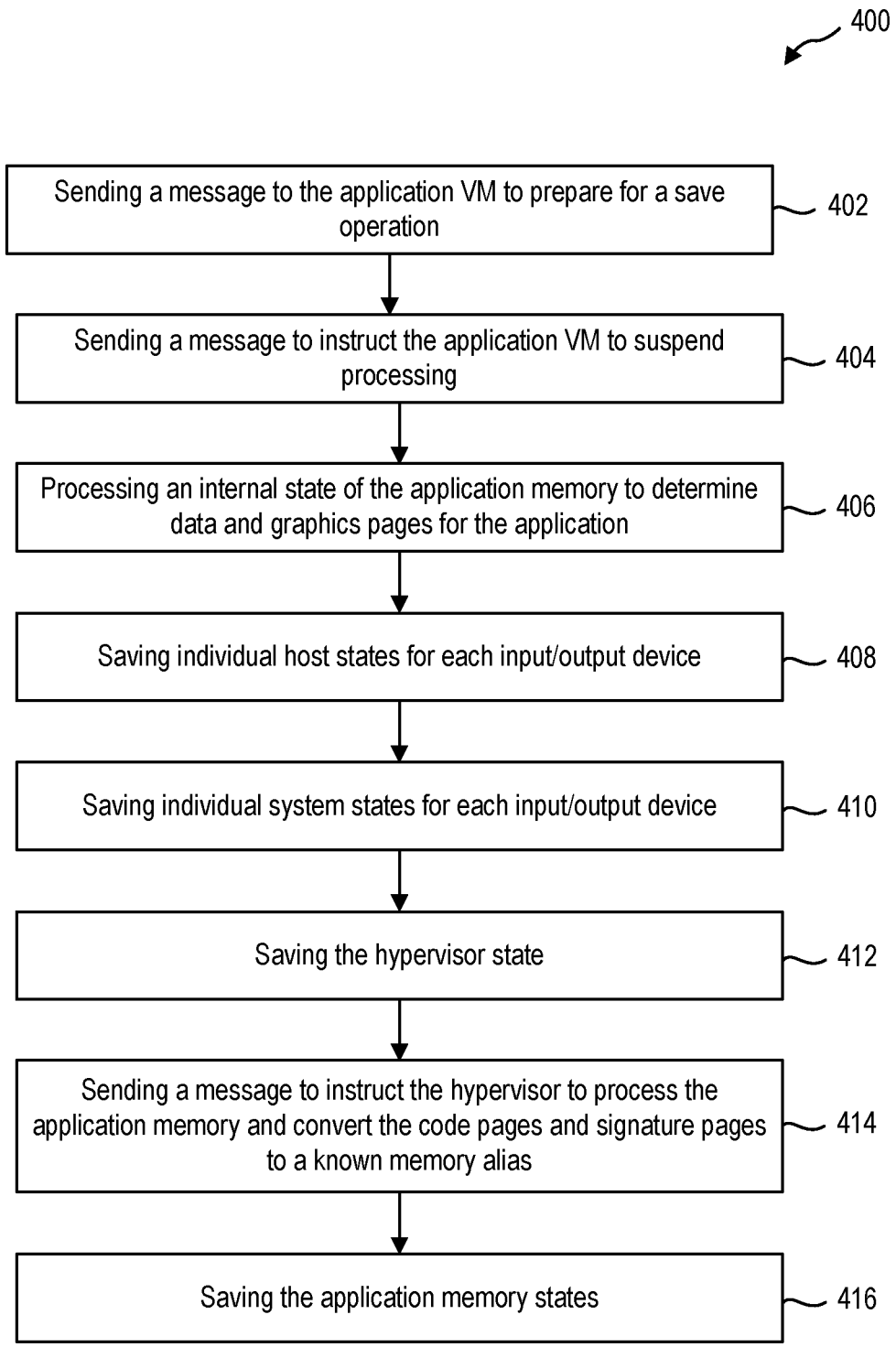
FIG. 4 is a flow diagram of an example method for saving an application executing on a virtual machine in accordance with an implementation of the present disclosure.

Referring now to FIG. 4, an example method 400 may be used by computer device 102 (FIG. 1) for saving an application memory state 12 (FIG. 1) of an application 10 (FIG. 1) executing on an application virtual machine 106 (FIG. 1). The actions of method 400 may be discussed below with reference to the architectures of FIGS. 1-3.

At 402, method 400 may include sending a message to the application virtual machine to prepare for a save operation. VM manager 18 may send a message or other communication to the application virtual machine 106 to prepare input and/or output devices on the application virtual machine 106 for a suspended state (e.g., stopping processing on the application virtual machine 106). VM manager 18 may also send a message or other communication to applications 10 on the application virtual machine 106 to prepare for the save operations.

At 404, method 400 may include sending a message to instruct the application virtual machine to suspend processing. VM manager 18 may send a message to hypervisor to instruct hypervisor 110 to suspend the application virtual machine 106. Hypervisor 110 may send a message or other communication to the application virtual machine 106 to pause, or otherwise stop, the execution of the applications 10 on application virtual machine 106 by suspending each virtual processor. Suspending the application virtual machine 106 may place the virtual machine 106 in a safe state where the processing of the application virtual machine 106 has paused or stopped. For example, VM manager 18 may suspend the application virtual machine 106 in response to receiving a request to save application 10, pause application 10, or exit application 10.

At 406, method 400 may include processing an internal state of the application memory to determine data and graphics pages for the application. An application memory 14 for application 10 may include a plurality of memory aliases where each memory alias includes encrypted application content for use with application 10. Each memory alias may include different encrypted application content. Encrypted application content may include, but is not limited to, executable code pages for application 10, data pages for application 10, graphics pages for application 10, and/or signature pages for application 10. In addition, each memory alias may use different encryption keys for encrypting the application content. As such, different application content for the same application may be stored in different memory aliases using different encryption keys.

For example, in a first memory alias, executable code pages for application 10 may be encrypted while graphics pages for application 10 may be encrypted in a second memory alias and signature pages for application 10 may be encrypted in a third memory alias. In addition, data pages for application 10 may be encrypted in a fourth memory alias. By isolating the application content through saving the application content in different memory aliases, additional security for the application content may be provided. In addition, additional security for enforcement against hardware attacks from outside the processor may be provided by using different memory aliases to encrypt different application content.

VM manager 18 may process the proper application memory state 12 created by the application virtual machine 106 by traversing a memory tracking table or database for the application virtual machine 106 that includes a hierarchy of application content for each of the applications 10. For example, a host virtual machine 104 in communication with the application virtual machine 106 may include a VM manager 18 with the memory tracking table for the application virtual machine 106. The memory tracking table may include all the memory host virtual machine 104 controls for application virtual machine 106. For example, host virtual machine 104 may control a subset of the application content (e.g., the data pages and graphic pages for application 10). As such, a subset of the application content for each of the plurality of applications 10 may be controlled by the VM manager 18. The memory tracking table may also identify which application content is currently being used by application 10.

The VM manager 18 may review the page table and determine which data pages and/or graphics pages are currently in use for application 10 and the associated memory aliases in application memory 14 for the data pages and/or graphics pages.

At 408, method 400 may include saving individual host states for each input or output device. VM manager 18 may save individual host states for each input or output device in use by applications 10. For example, host states may include hardware states 32 in use by applications 10. The hardware states 32 may include, but are not limited to, audio hardware, storage, and/or graphic states.

At 410, method 400 may include saving individual system states for each input or output device. VM manager 18 may save individual system states 34 for each input or output device in use by applications 10 in system storage 30. The one or more system states 34 may include, but are not limited to, input state, video state, storage state, and/or a networking state.

At 412, method 400 may include saving a hypervisor state. VM manager 18 may instruct the hypervisor 110 to save the hypervisor state 35 associated with application 10. For example, the hypervisor state 35 may identify the code and/or signature that are currently in use by application 10 and may save the code and/or signature pages currently in use by application 10. The hypervisor state 35 may also contain page table information, virtual processor information, interrupt controller information, timers, internal states, and/or other supporting states used by hypervisor 110 to virtualize a computer system.

At 416, method 400 may include sending a message to instruct the hypervisor to process the application memory and convert the code pages and signature pages to a known memory alias. Code pages may include pages that contain executable instructions for application virtual machine 106, which will be executed on the processor. In addition, signature pages may be used to verify the validity of the code pages. Hypervisor 110 may extract the information from the application memory 14 and properly transform the encrypted application content from each of the subset of memory aliases in use for application 10 that hypervisor 110 may control. For example, hypervisor 110 may control the code pages and the signature pages for application 10. As such, VM manager 18 may not be able to access the code pages and/or the signature pages for application 10.

Hypervisor 110 may process a memory tracking table or database that includes the memory hypervisor 110 controls for application virtual machine 106. The memory tracking table or database may identify which code pages and/or signature pages are currently in use for application 10. Hypervisor 110 may convert the identified memory aliases and the sensitive application state 22 from the identified memory aliases into a known memory aliases so that the host operating system 16 on host virtual machine 104 may read the sensitive application state 22 in the original form. The transformation process for the sensitive application state 22 may include decrypting the application content using the proper encryption keys for each of the memory aliases. The transformation process may also include hypervisor 110 generating a hash over the entire hypervisor state 35 and/or possible intermediate stages so that hypervisor 110 may verify the integrity of the restored virtual machine and/or the hypervisor state 35 of the restored virtual machine.

At 418, method 400 may include saving the application memory states. VM manager 18 may save the combined application states in system storage 30 on computer device 102. VM manager 18 may selectively read from the proper memory aliases in use for application 10 and save the application memory state 12 from the memory aliases to a persistent location on system storage 30. For example, VM manager 18 may save the application memory state 12 from identified memory aliases for the data pages and/or graphics pages in use for application 10. In addition, VM manager 18 may save the converted sensitive application state 22 from hypervisor 110 for the code pages and/or signature pages in use for application 10. In an implementation, VM manager 18 may perform an encryption on the sensitive application state 22 prior to storing the application memory state 12. As such, VM manager 18 may save the combined application memory state 12 to system storage 30.

Method 400 may be used to save the application memory state 12 from a secure memory used by an application 10. In addition, method 400 may be used to save the entire virtual machine state of the application by saving individual states of each component that provides services to an application 10 in a persistent location on system storage 30.

Figure 5:
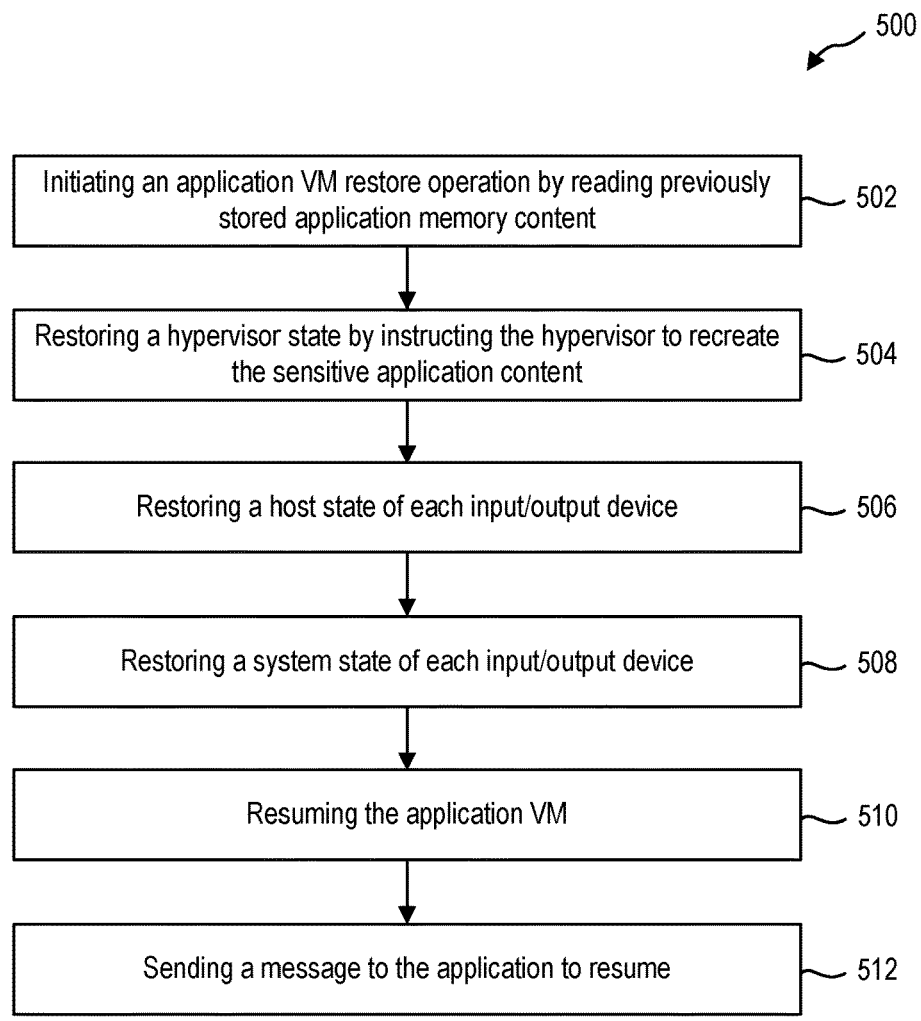
FIG. 5 is a flow diagram of an example method for restoring an application on a virtual machine in accordance with an implementation of the present disclosure.

Referring now to FIG. 5, an example method 500 may be used by computer device 102 (FIG. 1) for resuming a saved application 10 executing on an application virtual machine 106 (FIG. 1). The actions of method 500 may be discussed below with reference to the architectures of FIGS. 1-3.

At 502, method 500 may include initiating an application virtual machine restore operation by reading previously stored application memory content. VM manager 18 may initiate an application virtual machine 106 restore operation to resume execution of one or more applications 10 on application virtual machine 106. VM manager 18 may initiate the application virtual machine 106 restore operation in response to receiving a request to resume application 10. For example, a user may launch application 10 on application virtual machine 106.

VM manager 18 may determine whether application 10 may be resumed from a previously saved application memory state 12. For example, a user may select to load application 10 without using a saved application memory state 12 and/or application 10 may not have a saved application memory state 12. As such, VM manager 18 may instruct application virtual machine 106 to load application 10 without using a previously stored application memory state 12.

When VM manager 18 determines to resume application 10 from a previously saved application memory state 12, VM manager 18 may read the previously stored application memory state 12 from system storage 30. For example, VM manager 18 may read the data and/or graphics pages from the application memory state 12 and may map the encrypted application content back to the original memory aliases for the data and/or graphics pages.

At 504, method 500 may include restoring a hypervisor state by instructing the hypervisor to recreate the previous sensitive application content. VM manager 18 may instruct the hypervisor 110 to restore the hypervisor state 35 by recreating the previous sensitive application state 22 for application 10. For example, hypervisor 110 may access the code and/or signature pages from the saved application memory state 12 that were in use by application 10 when the application memory state 12 was saved. In addition, hypervisor 110 may access any page table information, virtual processor information, interrupt controller information, timers, internal states, and/or other supporting states that were in use when the application memory state 12 was saved. Hypervisor 110 may convert the sensitive application state 22 (e.g., the code and/or signature pages) back into the original encrypted application content and may map the encrypted application content back to the original memory aliases for the code and/or signature pages. Hypervisor 110 may verify the integrity of the restored hypervisor state 35 by checking against previously calculated hashes for various states.

At 506, method 500 may include restoring a host state of each input device or output device. Execution manager 26 in the host operating system 112 may restore one or more saved hardware states 32 so that the hardware components used by application 10 may resume as before application 10 was saved. Saved hardware states 32 may include, but are not limited to, audio hardware, storage, and/or graphic states. Execution manager 26 may restore the saved hardware states 32 from one or more virtual machines in use by application 10. In addition, if any hardware settings changed between creating the saved hardware states 32 and when application 10 is launched, the new hardware settings may be used by application 10.

When application 10 is launched using a previously saved state, the audio settings for the application may be restored so that the audio works as expected by the user. If the audio settings have changed between creating the saved hardware states 32 and when application 10 is launched, the new audio settings may be used by application 10. For example, if a game was previously played with a headset and the headset is no longer present, the current audio-out settings may be used by the game.

The graphics for application 10 may also be restored so that the graphics are working for application 10. For example, the graphics may be restored from a scene where a game stopped so that a user may resume playing the game in the scene where the game was saved. Other media and cut scene states may also be restored for the game.

At 508, method 500 may include restoring system states of each input device or output device. Execution manager 26 in the host operating system 112 may restore one or more saved system states 34 so that the system settings used by application 10 may resume as before application 10 was saved. Saved system states 34 may include, but are not limited to, input state, video state, storage state, and/or a networking state. Execution manager 26 may restore the saved system states 34 from one or more virtual machines in use by application 10. In addition, if any system settings changed between creating the saved system states 34 and when application 10 is launched, the new system settings may be used by application 10.

The networking settings may also be re-established so that application 10 may launch with working networking. If the network connections have changed since the application was previously used (e.g., different Wi-Fi network or switched from wired to Wi-Fi), application 10 may resume and reestablish network connectivity with the new network connections using a previously saved state.

In addition, the input may be restored for application 10 so that the input may work as expected by the user. If the input changes between creating the saved hardware states 32 and when application 10 is launched, new input settings may be used by application 10 when application 10 resumes. For example, if a controller has changed since the hardware state 32 was saved, the new controller may be used by application 10. Another example may include when additional input devices are present that were not present when the hardware state 32 was saved or previously connected input devices are no longer present, different input devices may be used by application 10. Another example may include if a connection of an input device changes after the hardware state 32 was saved (e.g., a connection was previously made wirelessly but is now connected to computer device 102 using a USB cable), a different connection for input device may be used by application 10.

The video configurations for application 10 may also be restored. For example, previously saved resolutions, reference rate, Standard Dynamic Range (SDR) or High Dynamic Range (HDR) settings may be restored so that application 10 may launch with working video.

At 510, method 500 may include resuming the application virtual machine. VM manager 18 may send a message to hypervisor 110 instructing hypervisor 110 to resume the processing on the application virtual machine 106.

At 512, method 500 may include sending a message to the application to resume. VM manager 18 may send a message to the application or application 10 to resume processing. For example, the application or application may resume from the previously saved application memory state 12.

Method 500 may be used to restore the complete state of applications or applications by restoring the previously saved application memory state 12 and the individual states of each component that provides services to the applications or. As such, method 500 may be used to restore the state of all the virtual machines in use with the applications. Method 500 may be used to resume an application by either returning directly to the point where a user left when the user saved or exited the application or starting the application from a menu or submenu system of the application eliminating a cold start load process for the application.

Figure 6:
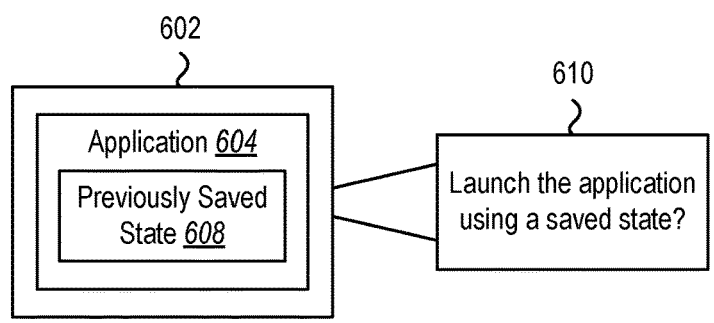
FIG. 6 is an example user interface screen that displays a previously saved state for an application in accordance with an implementation of the present disclosure.

Referring now to FIG. 6, illustrated is an example graphical user interface 602 for use with computer device 102 (FIG. 1) in accordance with an implementation. For example, graphical user interface 602 may provide a listing 604 of one or more applications 10 on computer device 102. The listing 604 may indicate whether one or more applications 10 allow a user to resume application 10 by returning to a previously saved application memory state 12 (FIG. 1). Resuming an application using a previously saved memory state may allow users to either return directly to the point where they left when the application was saved or exited or start the application from a menu or submenu system, eliminating a cold start load process for application 10 (e.g., logo parade, opening un-skippable movies, initial loads, etc.). As such, when users browse applications on computer device 102, users may be able to identify whether the applications may be launched using a previously saved state.

A communication 610 displayable via the graphical user interface may be read "launch the application using a saved state?" and a selectable option 608 may be presented on the graphical user interface to allow a user to select a previously saved state of application 10. The computer device 102 may perform a number of actions in response to a detected selection of the selectable option 608 to resume application 10 using a previously saved state. Computer device 102 may restore the previously saved application memory state 12, system states 34, and/or hardware states 32 and resume execution of application 10 so that application 10 may run just as application had before the application 10 was saved.

Figure 7:
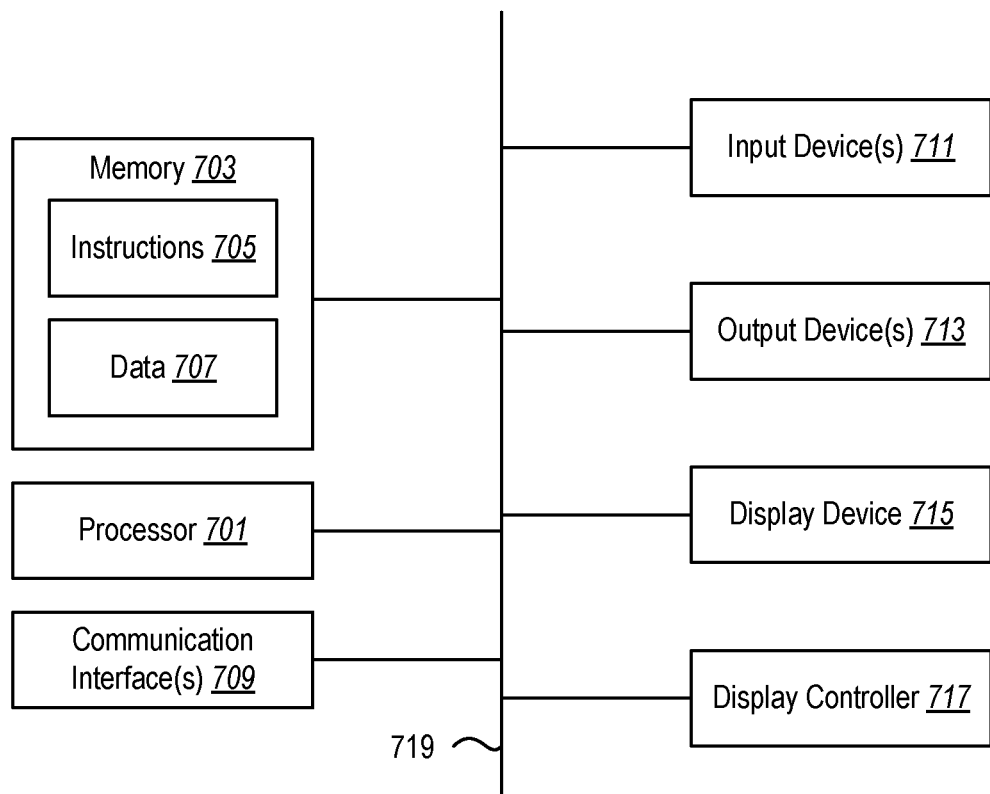
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
    sending a message to an application executing on an application virtual machine to prepare for a save operation;
    processing an internal state of an application memory to determine at least one or more of data pages or graphics pages in use for the application;
    instructing the processing of the application memory to determine at least one or more of code pages or signature pages in use for the application and converting the at least one or more of the code pages or the signature pages into a known memory alias; and
    saving an application memory state for the application, wherein the application memory state includes the at least one or more of the data pages or the graphics pages and the known memory alias with the at least one or more of the code pages or the signature pages.

2. The method of claim 1, wherein the application is a game.

3. The method of claim 1, wherein the application memory includes a plurality of memory aliases, wherein each of the plurality of memory aliases includes different application content.

4. The method of claim 3, wherein the application content includes one or more of the code pages, the data pages, the graphic pages, or the signature pages.

5. The method of claim 3, wherein each of the plurality of memory aliases uses a different encryption key for encrypting application content.

6. The method of claim 1, wherein saving the application memory state further includes encrypting the application memory state prior to storage.

7. The method of claim 1, further comprising:
    saving individual host states for each input device or output device associated with the application.

8. The method of claim 1, further comprising:
    saving individual system states for each input device or output device associated with the application.

9. The method of claim 1, further comprising:
    saving a hypervisor state associated with the application.

10. A computer device, comprising:
    at least one memory to store data and instructions;
    at least one processor in communication with the at least one memory; and
    an application virtual machine with an application in communication with the computer device, wherein the at least one processor is operable to:
        send a message to an application executing on the application virtual machine to prepare for a save operation;
        process an internal state of an application memory to determine at least one or more of data pages or graphics pages in use for the application;
        instruct the processing of the application memory to determine at least one or more of code pages or signature pages in use for the application and converting the at least one or more of the code pages or the signature pages into a known memory alias; and
        save an application memory state for the application, wherein the application memory state includes the at least one or more of the data pages or the graphics pages and the known memory alias with the at least one or more of the code pages or the signature pages.

11. The computer device of claim 10, wherein the application is a game.

12. The computer device of claim 10, wherein the application memory includes a plurality of memory aliases, wherein each of the plurality of memory aliases includes different application content.

13. The computer device of claim 12, wherein the application content includes one or more of the code pages, the data pages, the graphic pages, or the signature pages.

14. The computer device of claim 12, wherein each of the plurality of memory aliases uses a different encryption key for encrypting application content.

15. The computer device of claim 10, wherein saving the application memory state further includes encrypting the application memory state prior to storage.

16. The computer device of claim 10, wherein the at least one processor is further operable to save individual host states for each input device or output device associated with the application.

17. The computer device of claim 10, wherein the at least one processor is further operable to save individual system states for each input device or output device associated with the application.

18. The computer device of claim 10, wherein the at least one processor is further operable to save a hypervisor state associated with the application.

19. A method, comprising:
   initiating an application virtual machine restore operation by reading previously stored application memory content for an application;
   restoring a hypervisor state by instructing recreation of sensitive application content;
   restoring a host state of each input device or output device from a plurality of virtual machines associated with the application;
   restoring a system state of each input device or output device from the plurality of virtual machines associated with the application;
   resuming the application virtual machine; and
   sending a message to the application to resume.

20. The method of claim 19, wherein restoring the system state or the host state includes using new system settings or new host settings when changes are made to the system state or the host state between saving the system state or the host state and restoring the system state or the host state.

* * * * *